(12) United States Patent
Vialard (10) Patent No.: US 7,096,725 B2
(45) Date of Patent: Aug. 29, 2006

(54) CYLINDER HEAD GASKET WITH INTEGRATED SENSOR

(75) Inventor: Daniel J. Vialard, Northville, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/983,523

(22) Filed: Nov. 8, 2004

(65) Prior Publication Data

US 2006/0096362 A1    May 11, 2006

(51) Int. Cl.
*G01M 15/00* (2006.01)
*G01M 15/06* (2006.01)

(52) U.S. Cl. ............ 73/119 R; 72/116; 72/117.2; 72/117.3; 72/118.1; 72/115

(58) Field of Classification Search .......... None
See application file for complete search history.

(56) References Cited

U.S. PATENT DOCUMENTS

| | | | |
|---|---|---|---|
| 4,364,226 A | 12/1982 | Croset et al. ............. 60/276 |
| 4,397,176 A | 8/1983 | Rohde et al. ............. 73/35 |
| 4,399,706 A * | 8/1983 | List et al. ............. 73/708 |
| 4,686,861 A | 8/1987 | Morii ............. 73/862.68 |
| 5,066,023 A | 11/1991 | Ma ............. 277/2 |
| 5,121,929 A | 6/1992 | Cobb ............. 277/2 |
| 5,195,365 A | 3/1993 | Chujo et al. ............. 73/115 |
| 5,380,014 A | 1/1995 | Schaperkotter ............. 277/2 |
| 5,659,132 A | 8/1997 | Novak et al. ............. 73/115 |
| 5,877,425 A | 3/1999 | Suzuki et al. ............. 73/727 |
| 6,301,957 B1 | 10/2001 | Sakaguchi et al. ............. 73/117.3 |
| 6,532,737 B1 | 3/2003 | Kozerski et al. ............. 60/323 |
| 6,533,283 B1 | 3/2003 | Gottel ............. 277/317 |
| 6,843,111 B1 * | 1/2005 | Meyer et al. ............. 73/116 |
| 2003/0067121 A1 | 4/2003 | Gottel ............. 277/591 |
| 2003/0074957 A1 * | 4/2003 | Lemecha et al. ............. 73/118.1 |
| 2003/0115934 A1 | 6/2003 | Matsumoto et al. ............. 73/35.01 |

* cited by examiner

*Primary Examiner*—Edward Lefkowitz
*Assistant Examiner*—Freddie Kirkland, III
(74) *Attorney, Agent, or Firm*—Robert L. Stearns; Dickinson Wright PLLC

(57) ABSTRACT

A multilayer metal gasket for an internal combustion engine having an integrated sensor or sensors, such as a pressure sensor. The sensor is located within a combustion cylinder opening in the gasket. Preferably, a sensor is located within each combustion cylinder opening of the gasket. The gasket may also include an integrated sensor signal conditioning module. The gasket is made by a method which includes forming the necessary sensor housings and signal line channels within the spacing layers of the gasket.

24 Claims, 8 Drawing Sheets

CYLINDER HEAD GASKET WITH INTEGRATED SENSOR

BACKGROUND OF THE INVENTION

1. Technical Field

This invention is generally related to head gaskets for internal combustion engines. More particularly, the invention relates to multilayer metal head gaskets for internal combustion engines having an integrated sensor, such as a pressure sensor.

2. Related Art

In order to improve the control of an internal combustion engine, it is desirable to closely monitor the combustion process within the engine. It is most desirable to monitor the combustion process occurring within each of the cylinders of the engine (i.e., combustion pressure, temperature, etc.); however, it has not thus far been cost effective to incorporate such sensors, particularly combustion pressure sensors, into each of the cylinders, because of the machining required to incorporate the sensors into the cylinder block or cylinder head and the cost and packaging issues associated with multiple sensors, wiring harnesses, connectors and other items necessary to integrate such sensors.

It is desirable to integrate combustion sensors into the head gasket because the gasket itself is exposed to the combustion processes occurring in each cylinder, thereby eliminating a requirement for adding ports in the cylinder side wall or head in order to provide access to the combustion processes occurring in each cylinder. It is also very desirable to integrate combustion sensors and any necessary communication signal lines associated with them into multilayer metal head gaskets of conventional construction with a minimum of changes in the construction and technology currently used to make such gaskets. It is also very desirable to integrate a signal processing module or modules into the head gasket so as to minimize the distance over which the raw sensor signals must be transmitted prior to being processed, thereby minimizing issues associated with noise and/or signal loss, as well as minimizing the need for additional electrical hardware, such as wiring harnesses and connectors.

It is, therefore, an object of this invention to integrate combustion sensors into a multilayer metal head gasket of conventional construction. It is further an object of this invention to incorporate the sensor and associated signal lines into the spacing or distance layers of such a gasket. It is still further an object of this invention to incorporate a signal processing module into the integrated head gasket/sensor assembly.

SUMMARY OF THE INVENTION

The present invention is a multilayer metal gasket for an internal combustion engine having a combustion sensor or sensors incorporated into the combustion cylinder openings within the gasket. The sensors and associated communication signal lines are housed within the spacing layer or layers of the gasket. The gasket of the invention may optionally integrate a signal processing or conditioning module or modules onto the gasket.

A multilayer gasket of the present invention includes a first metal spacing layer having at least one opening for a combustion cylinder formed therein, the first spacing layer having a first sensor housing portion formed on a first surface thereof which opens into the combustion cylinder opening on the one end and on an opposing end into a first channel portion which extends outwardly away from the first sensor housing portion. The gasket also includes a second metal spacing layer having at least one opening for the combustion cylinder formed in a second surface thereof, the second spacing layer having a second sensor housing portion formed therein which opens into the combustion cylinder opening on one end and on an opposing end into a second channel portion which extends outwardly away from the second sensor housing portion; wherein the first sensor housing portion and the second sensor housing portion and the first channel portion and the second channel portion, respectively, are mating features and together form a sensor housing and a signal line channel when the first surface and the second surface are placed in touching contact. The invention also includes a sensor housed within the sensor housing, wherein the sensor is adapted to produce a sensor signal which is indicative of an environmental state within the combustion cylinder. The present invention also includes a signal communication line located in the signal line channel, wherein the signal communication line is adapted to communicate the sensor signal from the sensor.

According to the invention, the sensor also comprises a seal that is adapted to seal combustion gases produced within the combustion cylinder of the engine associated with the combustion cylinder opening so as to prevent release of the combustion gases into the sensor housing and signal line channel.

In accordance with the invention, the sensor may include a pressure sensor, temperature sensor or an integrated pressure sensor and temperature sensor, as well as any other suitable sensor desired for use in monitoring the combustion processes of the engine. One or more sensors, of the same or different types, may be incorporated into each combustion cylinder opening in the gasket.

In accordance with the invention, it is preferred that the gasket also includes at least one metal sealing layer having at least one opening for the combustion cylinder formed therein and at least one sealing surface surrounding the combustion cylinder opening. It is preferred that the sealing layer, first metal spacing layer and second metal spacing layer are formed from steel.

In an alternate embodiment to the one described above, a sensor mounting block is incorporated and attached to at least one of the first spacing layer and the second spacing layer, and the sensor is mounted into sensor housing in the sensor mounting block.

The present invention is particularly advantageous in that the sensor is integrated into a multilayer metal gasket of conventional construction. It is a further advantage that the sensor is directly exposed to the combustion processes occurring in the cylinder, particularly as compared to related art designs which did not directly expose the sensor to the cylinder and the associated combustion processes occurring therein. It is also an advantage of the present invention that the sensor and sensor signal lines may be incorporated without the need for utilizing additional specialized layers within the gasket to either house the sensor or rout the signal lines associated with the sensor. It is still further an advantage of the present invention to integrate not only the sensor and signal lines within the gasket, but also to integrate a signal processing or conditioning module associated with the same.

Accordingly, the present invention also includes methods of making multilayer metal gaskets for an internal combustion engine of the types described above. It is also an advantage of the present invention that the methods utilized to make multilayer metal gaskets having integrated sensors and signal lines incorporated therein generally utilize, with relatively minor adaptations, processes and equipment which are currently used for making multilayer metal gaskets of conventional construction.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Referring to FIGS. 1–5, one embodiment of a multilayer metal gasket 20 of the present invention is illustrated. In the illustrated embodiment, gasket 20 includes upper sealing layer 22 lower sealing layer 24, first spacing layer 26 and second spacing layer 28. Gasket 20 includes at least one combustion opening 30. In the illustrated embodiment, there exist two combustion cylinder openings 30. Gasket 20 may also incorporate various other openings. The may include openings associated with various fluid passageways (not shown), such as coolant flow or intake/exhaust gas circulation passageways, bolt openings 32, as well other openings as required in conjunction with a particular cylinder block and/or head design. Gasket 20 also has integrated therein one or more sensors 34 associated with the combustion cylinder openings 30. Sensors 34 are located in sensor housings 36 formed by the mating of first sensor housing portions 38 formed on a first surface 39 of first spacing layer 26 and second housing portions 40 formed on a second surface 41 of second spacing layer 28. Attached to sensors 34 are corresponding signal communication lines 42 which are housed in signal line channels 44 formed by the mating of first channel portions 46 formed in first spacing layer 26 and second channel portions 48 formed in second spacing layer 28. Signal communication lines 42 are in turn connected to a signal processing or conditioning module 50.

Figure 1:
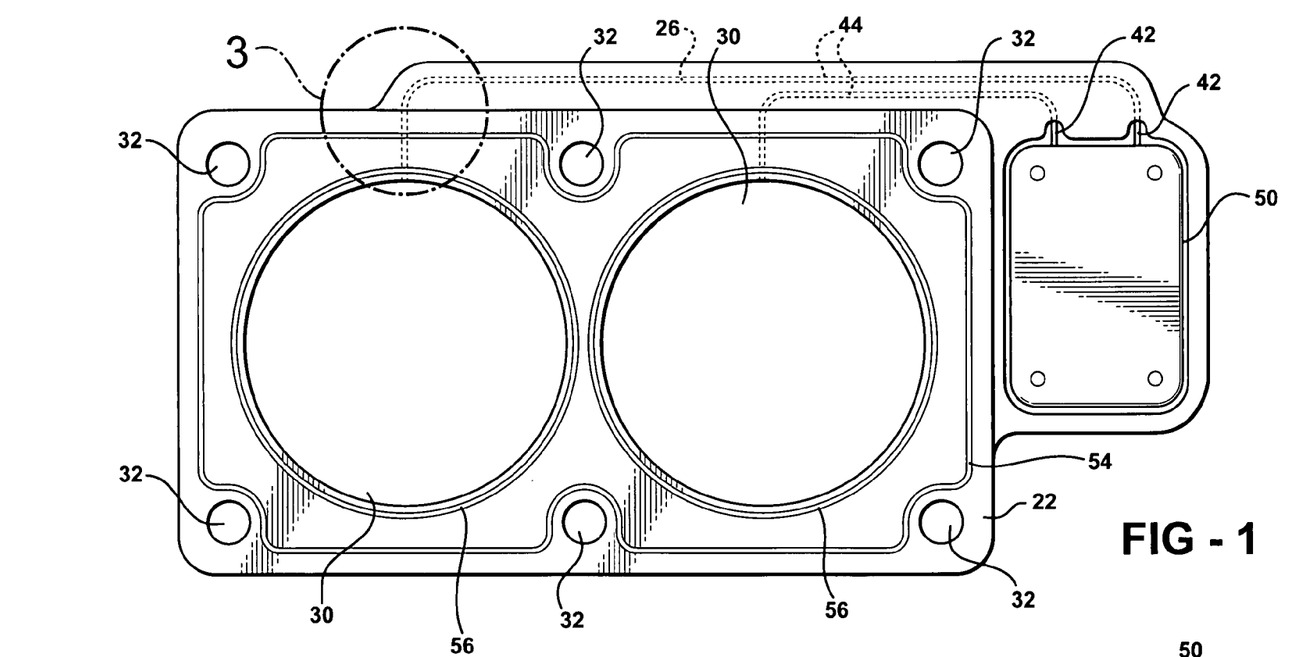
FIG. 1 is a schematic top view of a first embodiment of a multilayer metal gasket of the present invention.
Figure 2:
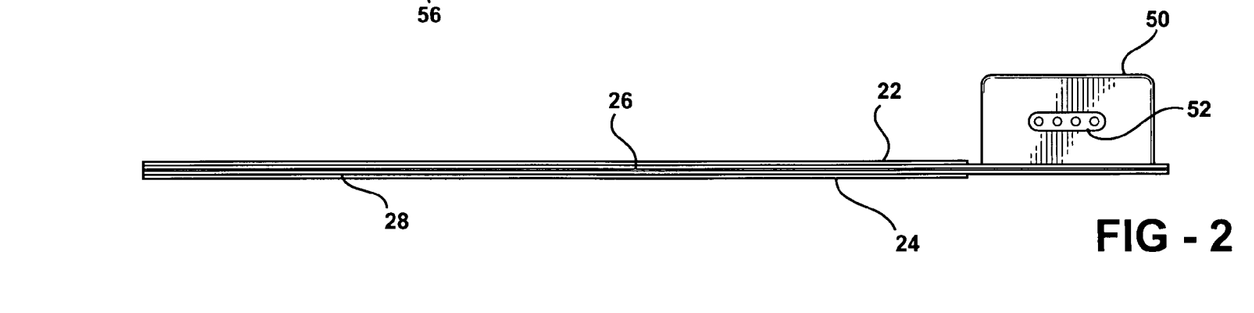
FIG. 2 is a side view of the gasket of FIG. 1.
Figure 3:
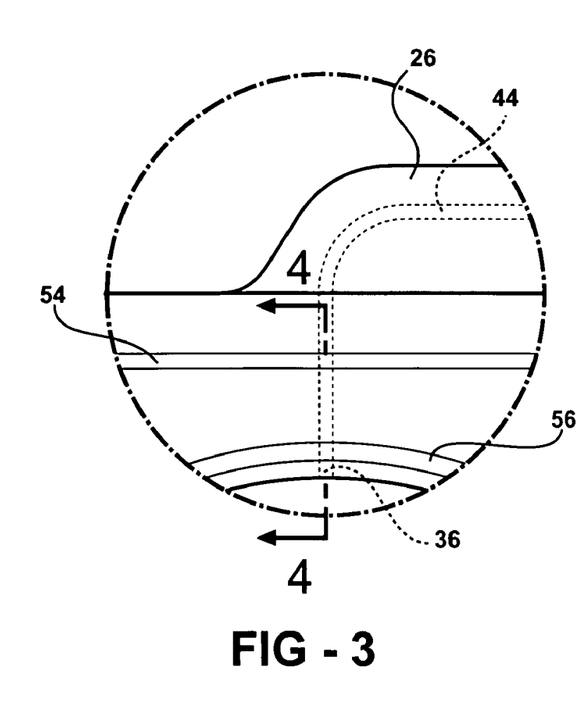
FIG. 3 is an enlarged view of region 3 of FIG. 1.
Figure 4:
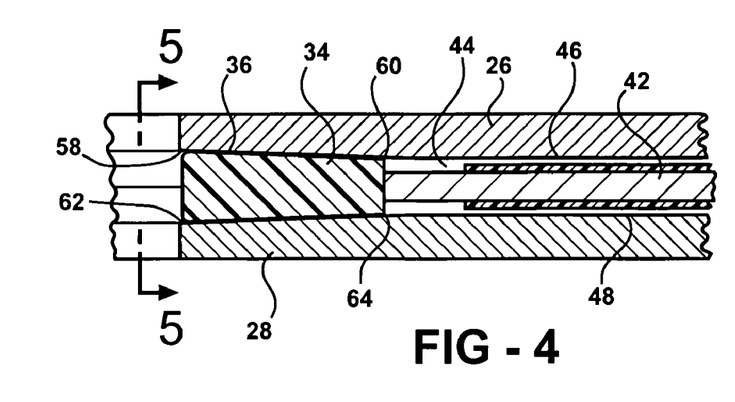
FIG. 4 is a section along line 4—4 of FIG. 3.
Figure 5:
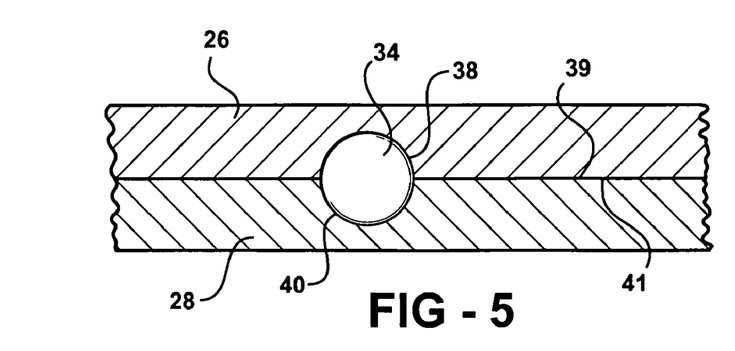
FIG. 5 is a section along line 5—5 of FIG. 3.

While any suitable metal gasket material may be utilized to fabricate upper sealing layer 22, lower sealing layer 24, first spacing layer 26 and second spacing layer 28, the use of various steel compositions is preferred. The materials, including the steel compositions, may be different for each of the layers, or the same for all of the layers, depending on the application. These layers may also incorporate various known coatings, including various polymer coatings, to enhance the performance of gasket 20 and the ability to seal on the desired sealing surfaces. Upper sealing layer 22 and lower sealing layer 24 are of conventional construction, and may incorporate any number of known debossment/embossment patterns, such as embossments 54 and 56. Embossments 56 comprise sealing surfaces associated with combustion cylinder openings 30. First spacing layer 26 and second spacing layer 28 are preferably flat, and do not include debossments/embossments or other features as sealing surfaces, except in conjunction with the formation of sensor housing portions and channel portions, as described further herein.

Sensors 34 may be any type of sensors which are suitable for sensing one or more aspects of the combustion process, including temperature sensors, pressure sensors, combined temperature/pressure sensor, but it is preferred that sensors 34 be pressure sensors, because of the many aspects of engine control that may be related to the combustion pressure. While any of a number of known types of pressure sensors and pressure sensing technologies may be utilized, it is desirable to minimize the thickness of the spacing layers (e.g., on the order of a few millimeters or less), and hence the size of the sensors. Thus, various types of piezoelectric or fiber optic pressure sensors are preferred, such as the Miniature High Temperature Pressure Sensor manufactured by Optrand of Plymouth, Mich. having a diameter of about 1.7 mm. Sensors 34 and sensor housings 36 will be sized and shaped so as to provide a seal between the combustion cylinder openings 30 and the sensor housings 36/signal line channels 44 when gasket 20 is inserted between the mating surfaces of the cylinder head and the engine block and compressed, such as by the tightening of the cylinder head bolts, so as to prevent combustion gases generated within the combustion cylinders of the engine from escaping into the sealing layers and to otherwise maintain the integrity of gasket 20. Gaskets 20 of the present invention having an overall uncompressed thickness of between about 2.0–2.5 mm have been constructed. However, it is believed that gasket 20 of the present invention having an overall thickness on the order of about 1.0–1.5 mm may be achievable.

The signal communication lines 42 may each comprise any signal line medium suitable for communicating the sensor signal output, which may be an analog or digital output, such as conductive wires, optical fibers or other signal line means. With some sensor types, it may also be possible to utilize the signal line channel itself as a waveguide, such that the signal line channel itself becomes the medium for transmitting the sensor signal. Signal communication lines 42 will be sized and shaped so as to enable them to be slidably inserted into signal line channels 44.

Signal processing or conditioning module 50 may be of conventional construction, including one or more microprocessors, signal conditioning electronics, signal buffers and other known signal processing components. Signal processing or conditioning module will be adapted to receive sensor signals from sensors 34 and provide an output signal or signals, such as through connector 52, to one or more controllers within the device to which the internal combustion engine is coupled, such as an automotive vehicle. Module 50 may be used to condition the sensor signal, such as by amplification of the signal such that it may be forwarded for further processing, or processed so as to convert the raw sensor signal output to a process signal form (e.g., converting analog sensor voltage signal outputs to analog or digital pressure outputs). Signal processing or conditioning module may also include a heat shield to shield module 50 from the effects of extreme temperatures in the region of the head gasket during operation of the engine. The heat shield may incorporate active heat removal by supply of a cooling fluid, or passive heat removal, such as by a heat reflective shield.

As an alternate of the embodiment described above, multilayer gasket 20 may omit the sealing layers (as they may be added in various numbers and combinations, such as those illustrated or other known configurations), and be described as first metal spacing layer 26 having at least one opening 30 for a combustion cylinder formed therein, first spacing layer 26 having first sensor housing portion 38 formed on first surface 39 thereof which opens into the combustion cylinder opening 30 on one end 58 and on an opposing end 60 into first channel portion 46 which extends outwardly away from the first sensor housing portion 38. Gasket 20 also includes second metal spacing layer 28 having at least one opening 30 for the combustion cylinder formed in second surface 41 thereof, the second spacing layer 28 having second sensor housing portion 40 formed therein which opens into the combustion cylinder opening 30 on one end 62 and on an opposing end 64 into second channel portion 48 which extends outwardly away from second sensor housing portion 40; wherein first sensor housing portion 38 and second sensor housing portion 40 and first channel portion 46 and second channel portion 48, respectively, are mating features and together form sensor housing 36 and signal line channel 44 when first surface 39 and second surface 41 are placed in touching contact. In this alternate of the embodiment, gasket 20 also includes sensor 34 housed within sensor housing 36, wherein sensor 34 is adapted to produce a sensor signal which is indicative of an environmental state, such as the combustion pressure, within the combustion cylinder, and signal communication line 42 located in signal line channel 44, wherein signal communication line 42 is adapted to communicate the sensor signal from sensor 34 during the operation of the engine while the combustion processes are occurring. In this alternate, signal processing module 50 may also be attached by means of a physical or mechanical attachment means, such as screws, bolts or other common fasteners to at least one of first spacing layer 26 or second spacing layer 28. Where utilized, signal processing module 50 will also be connected so as to be in signal communication with sensor 34 by means of the signal communication line 42. While this alternate is described with respect to a single combustion cylinder opening and sensor, it will be understood that the description is also applicable to gaskets having a plurality of combustion cylinder openings and a corresponding plurality of sensors 34 and sensor signal lines 42. It will also be understood to be applicable to the incorporation of multiple sensors 34, of the same or different types, and associated signal communication lines 42 into a single combustion cylinder opening 30. It will also be appreciated for both the disclosed embodiment and alternate that the sensor housings 36 may be oriented either perpendicular to the circumference of the opening or at an acute or obtuse angle thereto. It will still further be understood that the signal line channel 44, including first channel portion 46 and second channel portion 48, may be routed wherever required within their respective spacing layers, such as to the signal processing module 50 (if utilized) or to an exterior edge or surface of gasket 20. In the latter case, the signal communication lines will also preferably extend past the exterior edge or surface (not shown) and may be incorporated into an appropriate connector (not shown), depending on the communication medium selected.

Accordingly, the invention also comprises a method 100 of making a multilayer metal gasket 20 for an internal combustion engine, comprising the steps of: fabricating a first metal spacing layer 26 having at least one opening for a combustion cylinder formed therein; fabricating a second metal spacing layer 28 having at least one opening 30 for the combustion cylinder formed therein; forming a first sensor housing portion 38 and a first channel portion 46 which extends outwardly away from first sensor housing portion 38 on first surface 39 of first metal spacing layer 26, the first sensor housing portion 38 opening into the combustion cylinder opening on one end 58 and on an opposing end 60 into the first channel portion 46; forming a second sensor housing portion 40 and a second channel portion 48 which extends outwardly away from the second sensor housing portion 40 on a second surface 41 of the second metal spacing layer 28, the second sensor housing portion 40 opening into the combustion cylinder opening 30 on one end 62 and on an opposing end 64 into the second channel portion 48; wherein the first sensor housing portion 38 and the second sensor housing portion 40 and the first channel portion 46 and the second channel portion 48, respectively, are mating features and are adapted to together form a sensor housing 36 and a signal line channel 44, respectively, when the first metal spacing layer 26 and the second metal spacing layer 28 are assembled by placing the first surface 39 and the second surface 41 in mating contact; and assembling the first metal spacing layer 26 and the second metal spacing layer 28 by placing the first surface 39 and the second surface 41 in mating contact. Further, the method also preferably includes a step of installing a sensor 34 in the sensor housing 36 and a signal communication line 42 in the signal line channel 44. Still further, the method may include a step of attaching a signal processing module 50 to at least one of the first metal spacing layer 26 and the second metal spacing layer 28, wherein the signal processing module 50 is adapted to receive the sensor signal from the sensor 34 using the signal communication line 42.

Figure 6A:
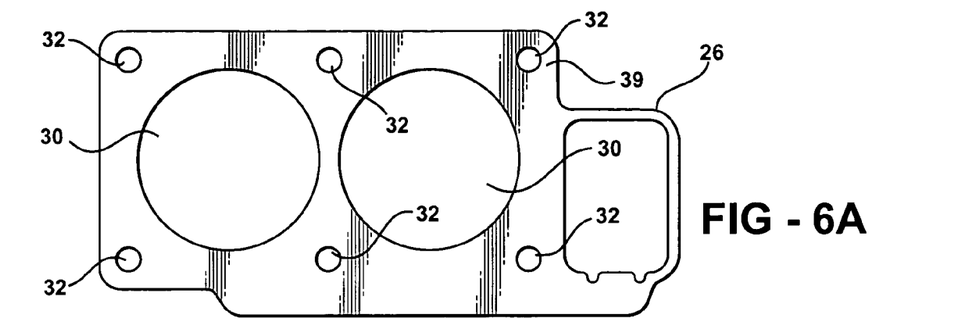
FIGS. 6a and 6b are plan views of the mating surfaces of a first spacing layer and second spacing layer of the illustrated embodiment.
Figure 6B:
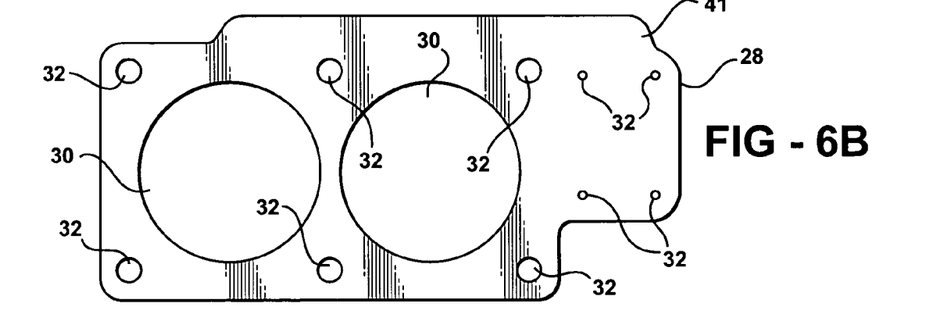

FIGS. 6A and 6B illustrate the steps of fabricating a first metal spacing layer 26 having at least one opening for a combustion cylinder formed therein (FIG. 6A) and fabricating a second metal spacing layer 28 having at least one opening 30 for the combustion cylinder formed therein (FIG. 6B). These layers may be fabricated from steel sheet. Fabricating of these layers may be performed using well known processes for defining the exterior edge of the gasket and producing the necessary openings, such as combustion openings 30 and bolt hole openings 32, such as, for example stamping or blanking using an appropriate die or dies, laser cutting, or various machining methods, including electro discharge machining (EDM).

Figure 7A:
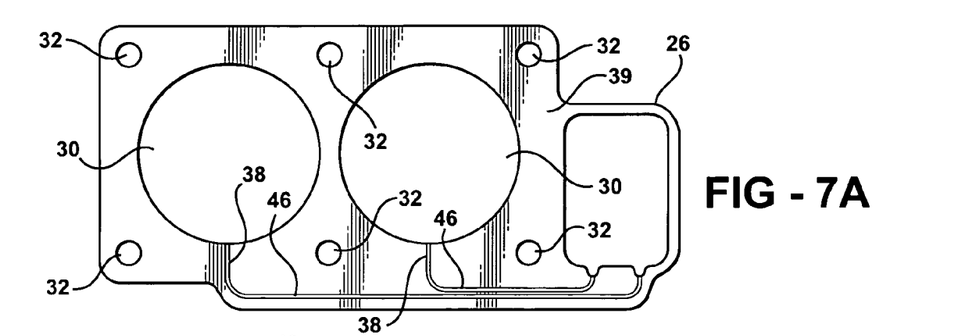
FIGS. 7a and 7b are plan views of mating surfaces of the first spacing layer and second spacing layer following forming of their respective channel portions.
Figure 7B:
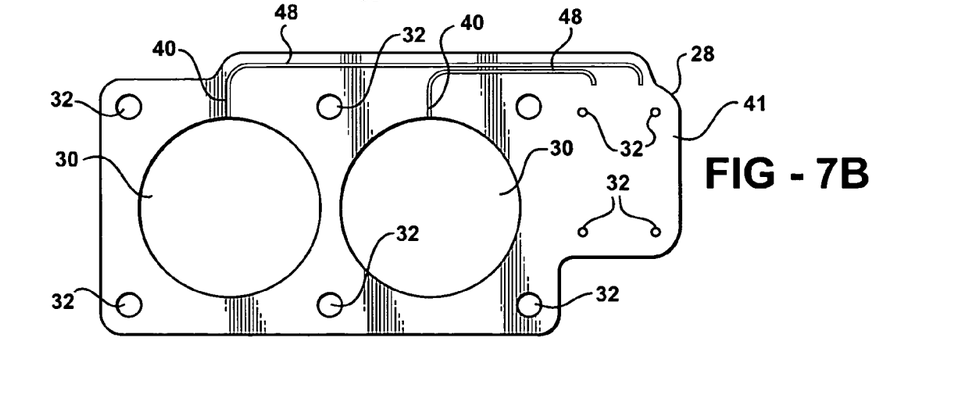

FIGS. 7A and 7B illustrate the steps of forming a first sensor housing portion 38 and a first channel portion 46 which extends outwardly away from first sensor housing portion 38 on first surface 39 of first metal spacing layer 26, the first sensor housing portion 38 opening into the combustion cylinder opening on one end 58 and on an opposing end 60 into the first channel portion 46 (FIG. 7A) and forming a second sensor housing portion 40 and a second channel portion 48 which extends outwardly away from the second sensor housing portion 40 on a second surface 41 of the second metal spacing layer 28, the second sensor housing portion 40 opening into the combustion cylinder opening 30 on one end 62 and on an opposing end 64 into the second channel portion 48 (FIG. 7B); wherein the first sensor housing portion 38 and the second sensor housing portion 40 and the first channel portion 46 and the second channel portion 48, respectively, are mating features and are adapted to together form a sensor housing 36 and a signal line channel 44, respectively, when the first metal spacing layer 26 and the second metal spacing layer 28 are assembled by placing the first surface 39 and the second surface 41 in mating contact. The sensor housing portions 38, 40 and channel portions 46, 48 may be formed in first surface 39 and second surface 41, respectively by well known methods for forming a channel in a metal sheet, including coining, machining, or chemical etching. It is desirable, however, that the method selected does not disturb the planarity of the respective spacing layers, particularly the planarity of the mating surfaces.

Figure 8:
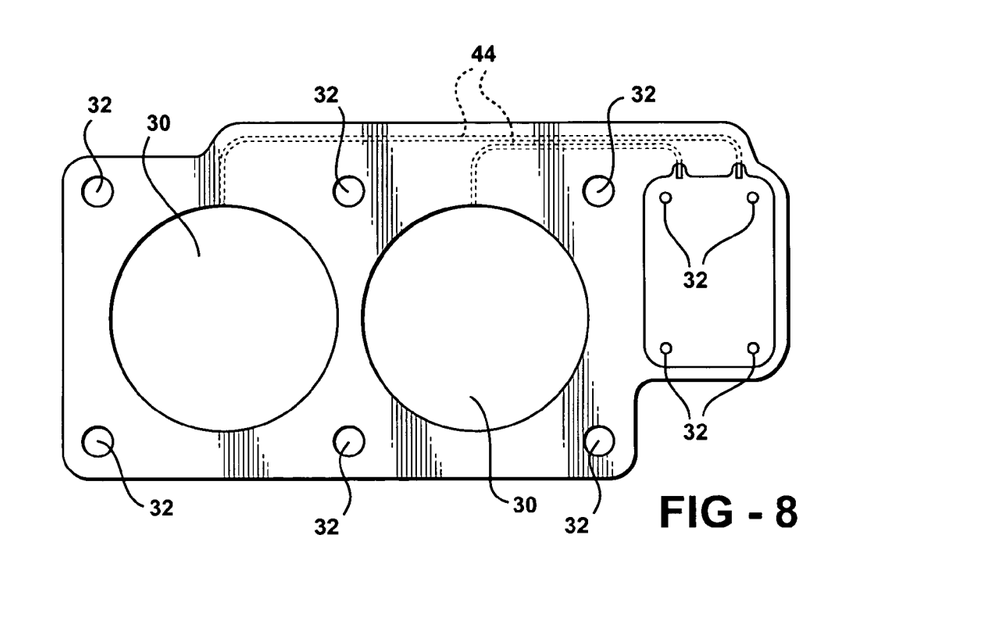
FIG. 8 is a schematic top view of an assembly comprising the first spacing layer and second spacing layer.

FIG. 8 illustrates the step of assembling the first metal spacing layer 26 (FIG. 7A) and the second metal spacing layer 28 (FIG. 7B) by placing the first surface 39 and the second surface 41 in mating contact. It is preferable that assembling comprise permanently joining these layers to one another, such as by riveting, welding, staking, crimping, adhesives or other comparable joining means or methods.

Following the step of assembling the layers, the method also may include the step of installing a sensor 34 in the sensor housing 36 and a signal communication line 42 in the signal line channel 44. The sensor and signal line may be connected to one another so as to be adapted for signal communication between them prior to their installation, or the signal line may be installed separately and then connected to the sensor. The installation may be performed by hand or with the use of a preprogrammed robot or other electromechanical or mechanical aid, jig or other device.

In addition to the step of installing the sensor and signal line, the method also may include a step of attaching a signal processing or conditioning module 50 to at least one of the first metal spacing layer 26 and the second metal spacing layer 28, wherein the signal processing or conditioning module 50 is adapted to receive the sensor signal from the sensor 34 using the signal communication line 42. This may be done using any suitable attachment means or methods, including welding, adhesives, fasteners, such as bolts or screws, or the like.

Figure 9:
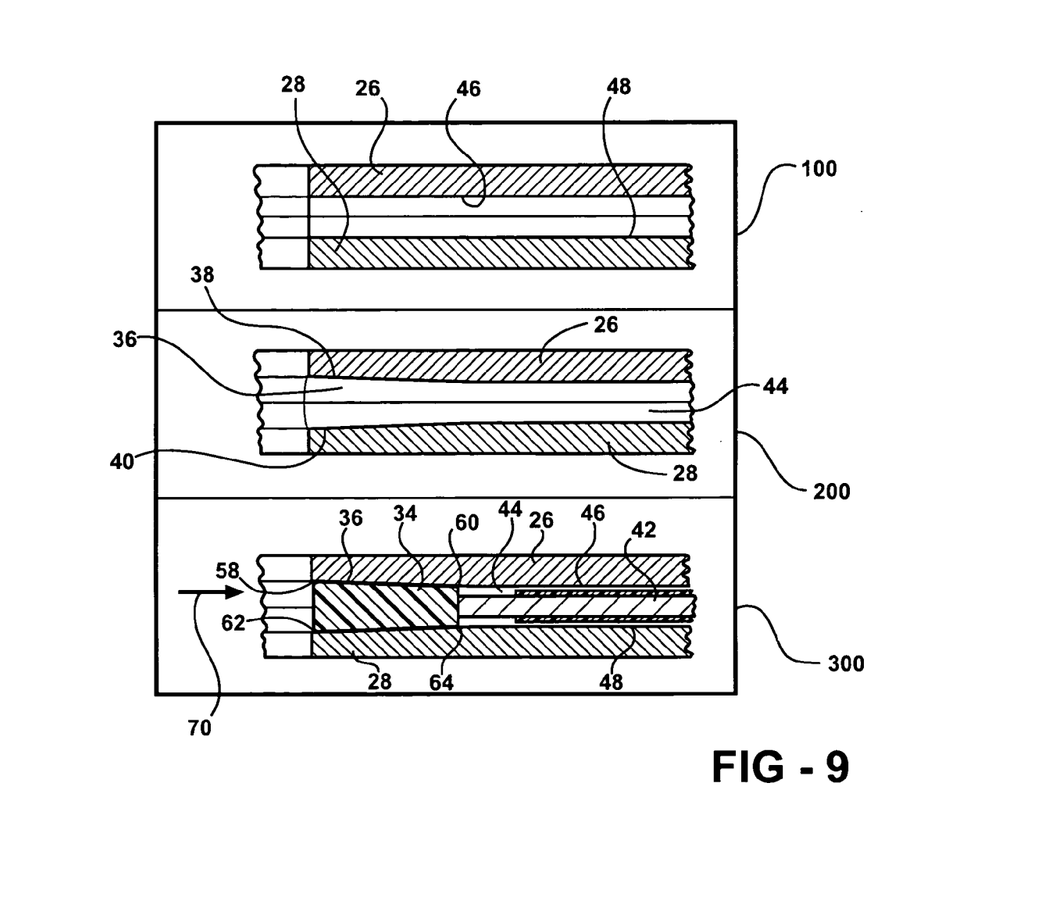
FIG. 9 is a section along line 9—9 of FIG. 8 illustrating various aspects of the method of the invention.
Figures 10, 11:
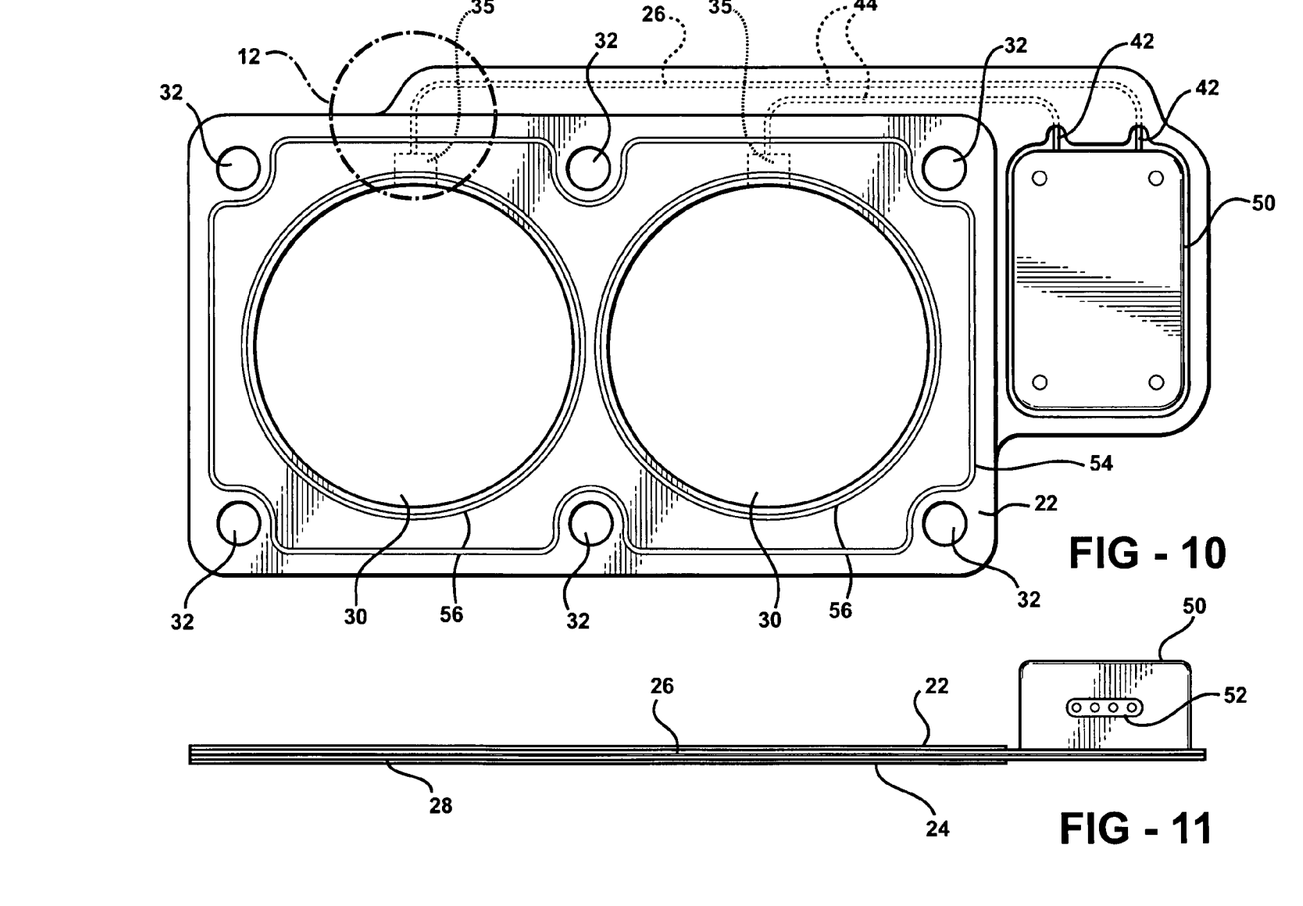
FIG. 10 is a schematic top view of a second embodiment of a multilayer metal gasket of the present invention.
FIG. 11 is a side view of the gasket of FIG. 10.
Figure 12:
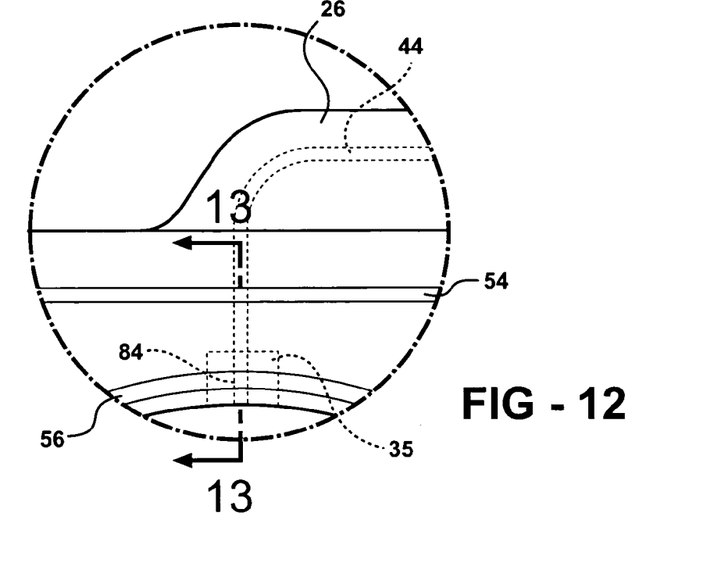
FIG. 12 is an enlarged view of region 12 of FIG. 10.
Figure 13:
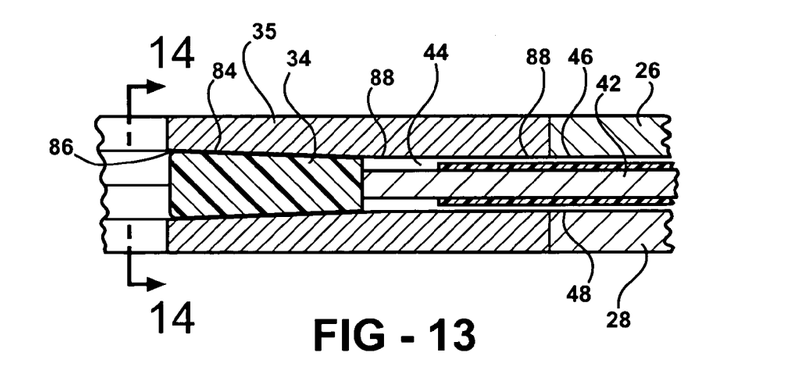
FIG. 13 is a section along line 13—13 of FIG. 12.
Figure 14:
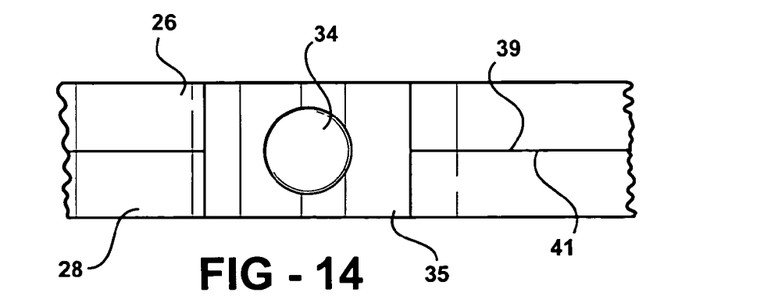
FIG. 14 is a section along line 14—14 of FIG. 12.
Figure 15A:
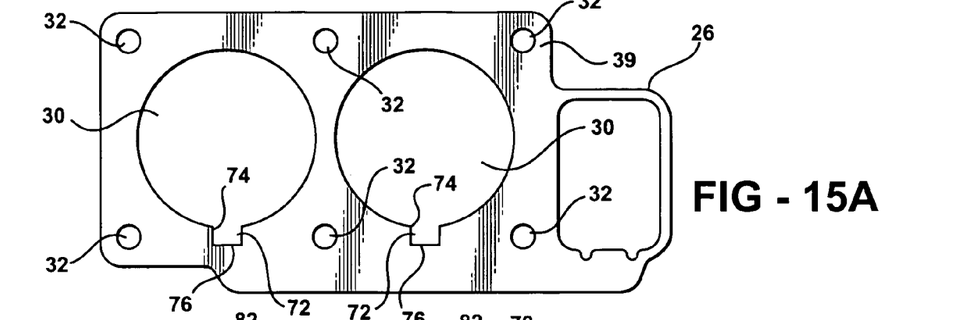
FIGS. 15a and 15b are plan views of the mating surfaces of a first spacing layer and second spacing layer of the illustrated embodiment.
Figure 15B:
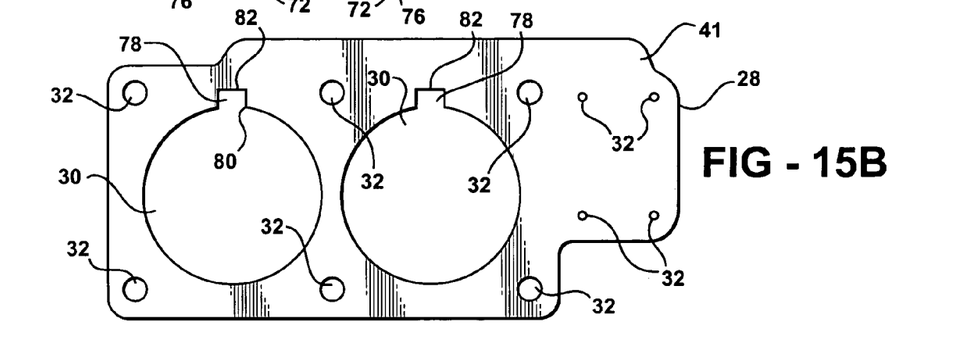
Figure 16A:
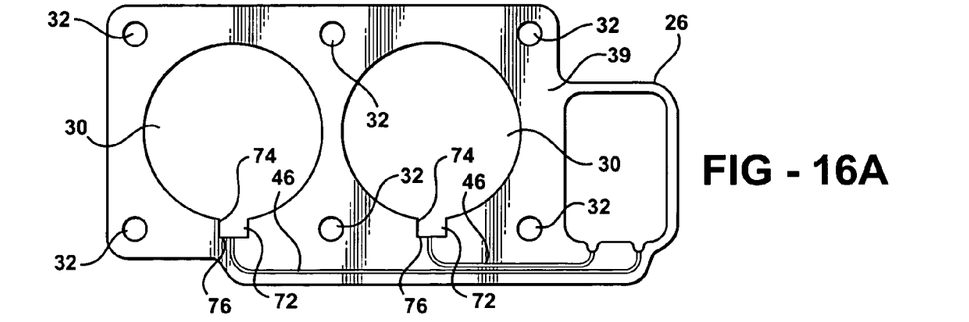
FIGS. 16a and 16b are plan views of mating surfaces of the first spacing layer and second spacing layer following forming of their respective channel portions.
Figure 16B:
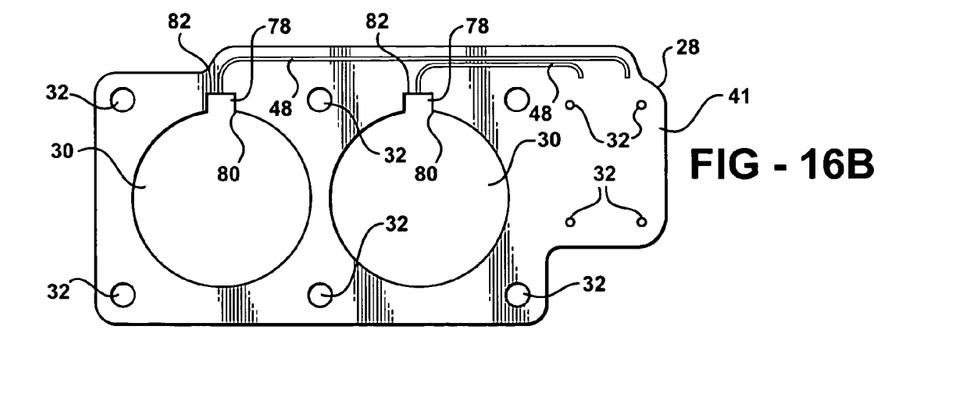
Figure 17:
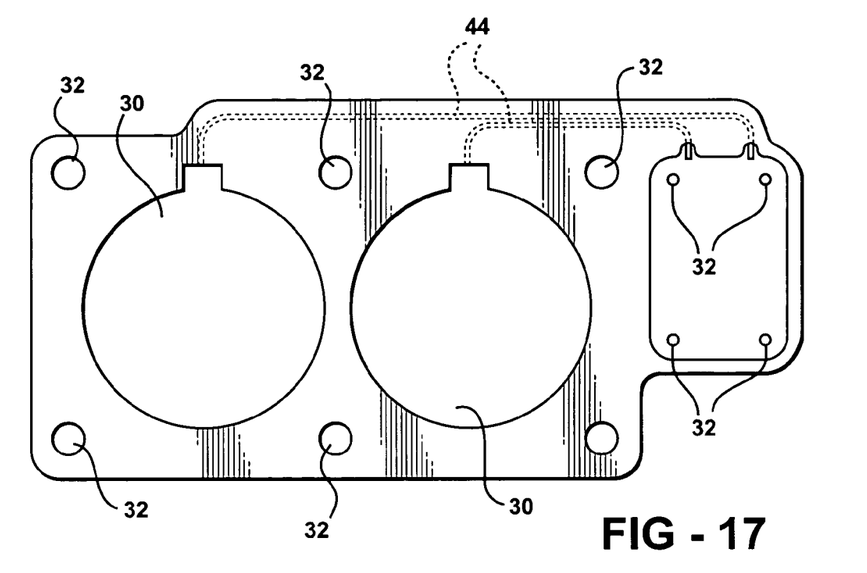
FIG. 17 is a schematic top view of an assembly comprising the first spacing layer and second spacing layer.

FIG. 9 illustrates one method of forming sensor housing 36 including the first sensor housing portion 38 and second sensor housing portion 40. In this case as illustrated in block 100, the first channel portion 46 and second channel portion 48 are formed within first surface 39 and second surface 41, respectively, including up to the combustion cylinder opening 30. Once the first spacing layer 26 and second spacing layer 28 have been assembled together forming signal line channel 44, sensor housing 36 comprising first sensor housing portion 38 and second sensor housing portion 40 is formed in a separate operation such as by inserting a ream or drill into the portion of the signal line channel 44 adjacent to combustion opening 30. As illustrated in block 200, it is preferred that sensor housing 36 have a frusto-conical shape. This shape is well suited to the insertion of sensor 34 and the formation of the seal between the combustion opening 30 and the remainder of sensor housing 36 and signal line channel 44. As illustrated in block 300, sensor 34 may be inserted from combustion cylinder opening 30 in the direction shown by arrow 70.

FIGS. 10–18 illustrate a second embodiment of a gasket of the present invention, as well as the method of making the gasket. The primary difference associated with this embodiment is the incorporation of a separate sensor block 35 into which sensor housing 36 is formed, rather than forming sensor housing 36 within the first spacing layer 26 and second spacing layer 28 as described in conjunction with the embodiment described above. In this embodiment, sensor block 35, including sensor housing 36, is formed separately from the spacing layers and attached to the spacing layers following the fabrication of the layers and the forming of signal line channel 44 including first channel portion 46 and second channel portion 48. FIGS. 10–18 utilize the same numbering scheme as used to describe the previous embodiment with respect to the common features thereof.

In this embodiment, multilayer metal gasket 20 for an internal combustion engine includes a first metal spacing layer 26 having at least one opening 30 for a combustion cylinder formed therein, the first spacing layer 26 having a first slot 72 which opens into the combustion cylinder opening 30 on one end 74 and on an opposing end 76 into a first channel portion 46 formed in a first surface 39 of the first metal spacing layer 26 which extends away from the first slot 72. Gasket 20 also includes a second metal spacing layer 28 having at least one opening 30 for the combustion cylinder formed therein, the second spacing layer 28 having a second slot 78 which opens into the combustion cylinder opening on one end 80 and on an opposing end 82 into a second channel portion 48 formed in a second surface 41 of the second metal spacing layer 28 which extends away from the second slot 78; wherein the first slot 72 and the second slot 78 and the first channel portion 46 and the second channel portion 48, respectively, are mating features and together form a sensor block slot 84 (FIG. 17) and a signal line channel 44 when the first surface 39 and the second surface 41 are placed in touching contact. Gasket 20 also includes a sensor block 35 which is attached to at least one of the first metal spacing layer 26 and the second metal spacing layer 28. Sensor block 35 has a sensor housing 36 formed therein which opens on one end 86 into the combustion cylinder opening and on a second end 88 into the signal line channel. Gasket 20 also includes a sensor 34 housed within the sensor housing 36, wherein the sensor 34 is adapted to produce a sensor signal which is indicative of an environmental state within the combustion cylinder, and a signal communication line 42 located in the signal line channel 44, wherein the signal communication line 42 is adapted to communicate the sensor signal from the sensor 34.

In this embodiment, the method of making gasket 20 may be described as including the steps of: fabricating a first metal spacing layer 26 having at least one opening 30 for a combustion cylinder formed therein, the first spacing layer 26 having a first slot 72 which opens into the combustion cylinder opening 30 on one end 74; fabricating a second metal spacing layer 28 having at least one opening 30 for the combustion cylinder formed therein, the second spacing layer 28 having a second slot 78 which opens into the combustion cylinder opening 30 on one end 80; forming a first channel portion 46 on a first surface 39 of the first metal spacing layer 26 which opens into the first slot 72 and which extends outwardly away from the first slot 72; forming a second channel portion 48 on a second surface 41 of the second metal spacing layer 28 which opens into the second slot 78 and which extends outwardly away from the second slot 78; wherein the first slot 72 and the second slot 78 and the first channel portion 46 and the second channel portion 48, respectively are mating features and are adapted to together form a sensor block slot 84 and a signal line channel 44, respectively, when the first metal spacing layer 26 and the second metal spacing layer 28 are assembled by placing the first surface 39 and the second surface 41 in mating contact; assembling the first metal spacing layer 26 and the second metal spacing layer 28 by placing the first surface 39 and the second surface 41 in mating contact; and attaching a sensor block 35 to at least one of the first metal spacing layer 26 and the second metal spacing layer 28, the sensor block 35 having a sensor housing 36 formed therein which opens on one end 86 into the combustion cylinder opening 30 and on a second end 88 into the signal line channel. The steps of installing the sensor 34 and the signal line 42 in the signal line channel 44 are analogous to those described above for the previous embodiment, as is the step of attaching the signal processing module 50.

Figure 18:
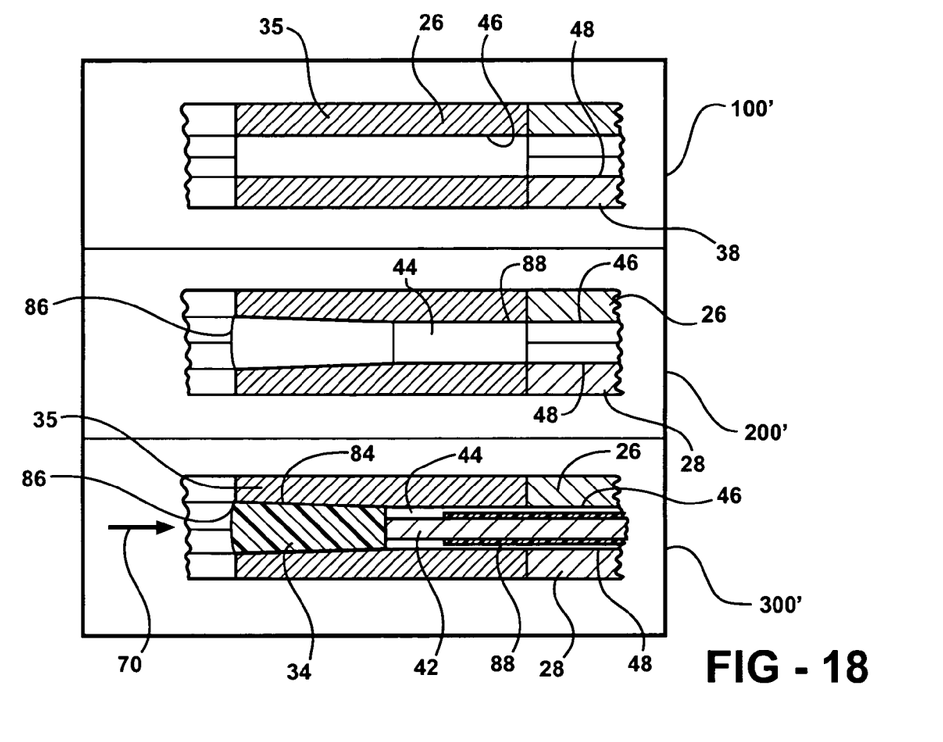
FIG. 18 is a section along line 17—17 of FIG. 17 illustrating various aspects of the method of the invention.

FIG. 18 illustrates a series of steps analogous to those described above with respect to blocks 100, 200, and 300 of FIG. 9, but identified as blocks 100', 200' and 300', respectively, for forming the sensor housing 36 in the sensor block 35 after it has been attached to at least one of first spacing layer 26 and second spacing layer 28. Attaching of sensor block 35 may be accomplished by any of a number of well known means for attachment of a metal block to an assembly of metal sheets, such as welding or the use of various types of adhesives, such as epoxy type adhesives.

Obviously, many modifications and variations of the present invention are possible in light of the above teachings. It is, therefore, to be understood that within the scope of the appended claims, the invention may be practiced otherwise than as specifically described. The invention is defined by the claims.

The invention claimed is:

1. A multilayer metal gasket for an internal combustion engine, comprising:
    a first metal spacing layer having at least one opening for a combustion cylinder formed therein, said first spacing layer having a first sensor housing portion formed on a first surface thereof which opens into the combustion cylinder opening on one end and on an opposing end into a first channel portion which extends outwardly away from the first sensor housing portion;
    a second metal spacing layer separate from said first spacing layer; said second spacing layer having at least one opening for the combustion cylinder formed in a second surface thereof, said second spacing layer having a second sensor housing portion formed therein which opens into the combustion cylinder opening on one end and on an opposing end into a second channel portion which extends outwardly away from the second sensor housing portion; wherein the first sensor housing portion and the second sensor housing portion and the first channel portion and the second channel portion, respectively, are mating features and together form a sensor housing and a circumferentially enclosed signal line channel when the first surface and the second surface are placed in mating contact with one another;
    a sensor housed within the sensor housing; wherein said sensor is adapted to produce a sensor signal which is indicative of an environmental state within the combustion cylinder;
    a signal communication line located in the signal line channel, wherein said signal communication line is adapted to communicate the sensor signal from said sensor; and
    at least one metal sealing layer overlaying at least one of said first or second spacing layers and having at least one opening for the combustion cylinder formed therein and at least one outwardly facing sealing embossment overlaying said signal line channel in noninterfering relation with said signal communication line.

2. The gasket of claim 1, wherein the sensor comprises a seal that is adapted to seal combustion gases within a combustion cylinder of the engine associated with the combustion cylinder opening and prevent release of the combustion gases into the sensor housing and signal line channel.

3. The gasket of claim 1 further comprising an upper metal sealing layer overlying said first spacing layer and a lower metal sealing layer overlying said second spacing layer, said upper and lower sealing layers having at least one sealing embossment facing outwardly from one another, said signal line channel passing between said sealing embossments in noninterfering relation therewith.

4. The gasket of claim 3 wherein said upper and lower sealing layers each have a pair of sealing embossments facing outwardly from one another, one of said pair of embossments being proximate and extending concentrically to said opening and the other of said pair of embossments being spaced outwardly from said opening.

5. The gasket of claim 1, wherein said sensor comprises a pressure sensor.

6. The gasket of claim 1, wherein said signal communication line is selected from a group consisting of a metal conductor, an optical fiber and a waveguide.

7. The gasket of claim 1, wherein said first metal spacing layer and said second metal spacing layer are formed from steel.

8. The gasket of claim 1, further comprising a signal processing module attached to at least one of said first metal spacing layer and said second metal spacing layer, wherein said signal processing module is adapted for signal communication with the sensor and adapted to receive the sensor signal from said sensor using the signal communication line.

9. The gasket of claim 8, further comprising a heat shield which is attached to said signal processing module.

10. A multilayer metal gasket for an internal combustion engine, comprising:
    a first metal spacing layer having at least one opening for a combustion cylinder formed therein, said first spacing layer having a first slot which opens into the combustion cylinder opening on one end and on an opposing end into a first channel portion formed in a first surface of said fir metal spacing layer which extends away from the first slot;
    a second metal spacing layer separate from said first spacing layer and having at least one opening for the combustion cylinder formed therein, said second spacing layer having a second slot which opens into the combustion cylinder opening on one end and on an opposing end into a second channel portion formed in a second surface of said second metal spacing layer which extends away from the second slot; wherein the first slot and the second slot and the first channel portion and the second channel portion, respectively, are mating features and together form a sensor block slot and a circumferentially enclosed signal line channel when the first surface and the second surface are placed in mating contact;
    a sensor block which is attached to at least one of said first metal spacing layer and said second metal spacing layer, said sensor block having a sensor housing formed therein which opens on one end into the combustion cylinder opening and on a second end into the signal line channel;

a sensor housed within the sensor housing; wherein said sensor is adapted to produce a sensor signal which is indicative of an environmental state within the combustion cylinder;

a signal communication line located in the circumferentially enclosed signal line channel, wherein said signal communication line is adapted to communicate the sensor signal from said sensor; and at least one metal sealing layer overlaying at least one of said first or second spacing layers and having at least one opening for the combustion cylinder formed therein and at least one outwardly facing sealing embossment overlaying said signal line channel in noninterfering relation with said signal communication line.

11. The gasket of claim 10, wherein the sensor comprises a seal that is adapted to seal combustion gases within a combustion cylinder of the engine associated with the combustion cylinder opening and prevent release of the combustion gases into the sensor housing and signal line channel.

12. The gasket of claim 10 further comprising an upper metal sealing layer overlying said first spacing layer and a lower metal sealing layer overlying said second spacing layer, said upper and lower sealing layers having at least one sealing embossment facing outwardly from one another, said signal line channel passing between said sealing embossments in noninterfering relation therewith.

13. The gasket of claim 10 wherein said upper and lower sealing layers each have a pair of sealing embossments facing outwardly from one another, one of said pair of embossments being proximate and extending concentrically to said opening and the other of said pair of embossments being spaced outwardly from said opening.

14. The gasket of claim 10, wherein said sensor comprises a pressure sensor.

15. The gasket of claim 10, wherein said signal communication line is selected from a group consisting of a metal conductor, an optical fiber and a waveguide.

16. The gasket of claim 10, wherein said first metal spacing layer and said second metal spacing layer are formed from steel.

17. The gasket of claim 10, further comprising a signal processing module attached to at least one of said first metal spacing layer and said second metal spacing layer, wherein said signal processing module is adapted for signal communication with the sensor and adapted to receive the sensor signal from said sensor using the signal communication line.

18. The gasket of claim 17, further comprising a heat shield which is attached to said signal processing module.

19. A method of making a multilayer metal gasket for an internal combustion engine, comprising the steps of;

fabricating a first metal spacing layer having at least one opening for a combustion cylinder formed therein;

fabricating a second metal spacing layer having at least one opening for the combustion cylinder formed therein;

forming a first sensor housing portion and a first channel portion which extends outwardly away from the first sensor housing portion on a first surface of the first metal spacing layer, the first sensor housing portion opening into the combustion cylinder opening on one end and on an opposing end into the first channel portion;

forming a second sensor housing portion and a second channel portion which extends outwardly away from the second sensor housing portion on a second surface of the second metal spacing layer, the second sensor housing portion opening into the combustion cylinder opening on one end and on an opposing end into the second channel portion; wherein the first sensor housing portion and the second sensor housing portion and the first channel portion and the second channel portion, respectively, mate to form a sensor housing and a signal line channel, respectively, when the first metal spacing layer and the second metal spacing layer are assembled by placing the first surface and the second surface in mating contact;

assembling the first metal spacing layer and the second metal spacing layer by placing the first surface and the second surface in mating contact; and forming a sealing layer on at least one of said first or second spacing layers, said sealing layer having an opening corresponding to said at least one opening and a sealing embossment facing outwardly from said signal line channel and in overlying relation to said signal line channel.

20. The method of claim 19, further comprising the step of:

installing a sensor in the sensor housing and a signal line in the signal line channel.

21. The method of claim 20, further comprising the step of:

attaching a signal processing module to at least one of said first metal spacing layer and said second metal spacing layer, wherein said signal processing module is adapted to receive the sensor signal from said sensor using the signal communication line.

22. A method of making a multilayer metal gasket for an internal combustion engine, comprising the steps of;

fabricating a first metal spacing layer having at least one opening for a combustion cylinder formed therein, the first spacing layer having a first slot which opens into the combustion cylinder opening on one end;

fabricating a second metal spacing layer separate from said first spacing layer and having at least one opening for the combustion cylinder formed therein, the second spacing layer having a second slot which opens into the combustion cylinder opening on one end;

forming a first channel portion on a first surface of the first metal spacing layer which opens into the first slot and which extends outwardly away from the first slot;

forming a second channel portion on a second surface of the second metal spacing layer which opens into the second slot and which extends outwardly away from the second slot; wherein the first slot and the second slot and the first channel portion and the second channel portion, respectively, are mating features and form a sensor block slot and a signal line channel, respectively, when the first metal spacing layer and the second metal spacing layer are assembled by placing the first surface and the second surface in mating contact;

assembling the first metal spacing layer and the second metal spacing layer by placing the first surface and the second surface in mating contact;

attaching a sensor block in the sensor block slot to at least one of said first metal spacing layer and said second metal spacing layer, the sensor block having a sensor housing formed therein which opens on one end into the combustion cylinder opening and on a second end into the signal line channel; and forming a sealing layer on at least one of said first or second spacing layers, said sealing layer having an opening corresponding to said at least one opening and a sealing embossment facing outwardly from said signal line channel and in overlying relation to said signal line channel.

23. The method of claim 22, further comprising the step of:

installing a sensor in the sensor housing and a signal line in the signal line channel.

24. The method of claim 23, further comprising the step of:

attaching a signal processing module to at least one of said first metal spacing layer and said second metal spacing layer, wherein said signal processing module is adapted to receive the sensor signal from said sensor using the signal communication line.

* * * * *

UNITED STATES PATENT AND TRADEMARK OFFICE
CERTIFICATE OF CORRECTION

PATENT NO.       : 7,096,725 B2
APPLICATION NO.  : 10/983523
DATED            : August 29, 2006
INVENTOR(S)      : Daniel J. Vialard Page 1 of 1

It is certified that error appears in the above-identified patent and that said Letters Patent is hereby corrected as shown below:

Column 3, line 43: "the invention;" should be --the invention.--.

Column 10, line 44: "engine, comprising;" should be --engine, comprising:--.

Column 10, line 50: "of said fir metal" should be --of said first metal--.

Column 11, line 56: "steps of;" should be --steps of:--.

Column 12, line 39: "steps of;" should be --steps of:--.

Signed and Sealed this

Sixth Day of March, 2007

JON W. DUDAS
*Director of the United States Patent and Trademark Office*